June 17, 1941. G. FLEISCHEL Re. 21,828

PROGRESSIVE CLUTCH CONTROL FOR AUTOMATIC GEAR SHIFTING SYSTEMS

Original Filed March 4 1931 6 Sheets-Sheet 1

Gaston Fleischel
Inventor
by Louis Barnett
Attorney.

June 17, 1941. G. FLEISCHEL Re. 21,828

PROGRESSIVE CLUTCH CONTROL FOR AUTOMATIC GEAR SHIFTING SYSTEMS

Original Filed March 4, 1931 6 Sheets-Sheet 2

Gaston Fleischel
Inventor by Louis Barnett
Attorney.

PROGRESSIVE CLUTCH CONTROL FOR AUTOMATIC GEAR SHIFTING SYSTEMS
Original Filed March 4, 1931 6 Sheets-Sheet 3
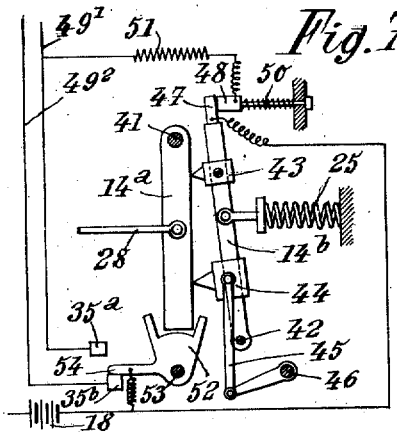
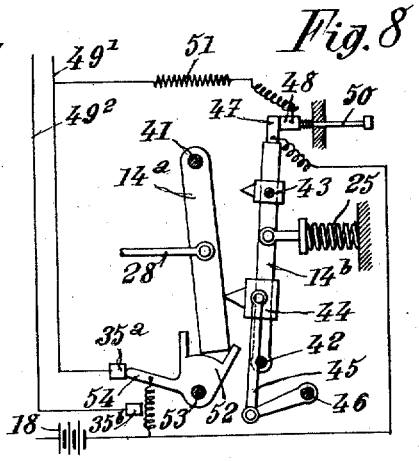
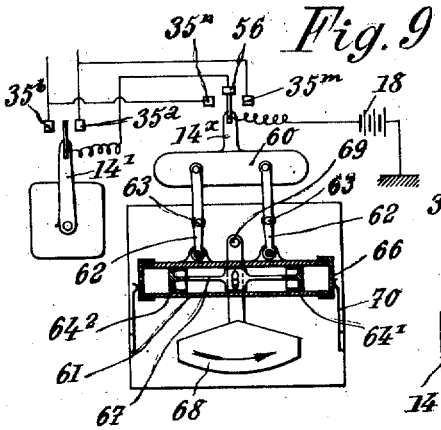
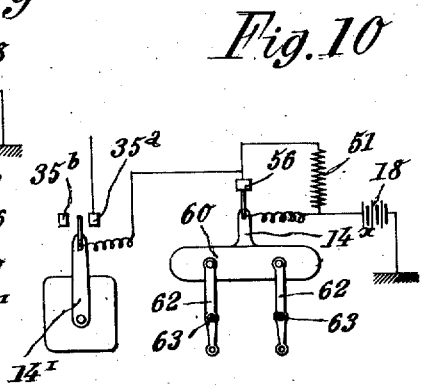
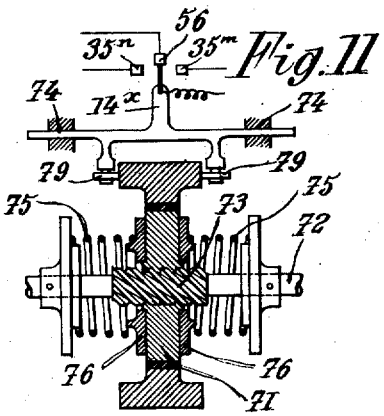
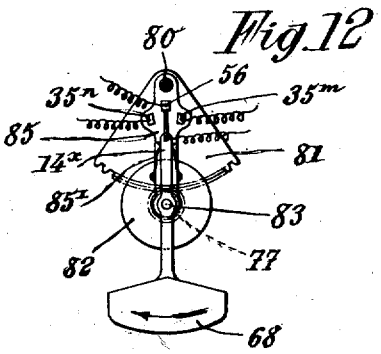
Gaston Fleischel
Inventor
by Louis Barnett
Attorney

PROGRESSIVE CLUTCH CONTROL FOR AUTOMATIC GEAR SHIFTING SYSTEMS

Original Filed March 4, 1931 6 Sheets-Sheet 4

Gaston Fleischel
Inventor by Louis Barnett
Attorney

June 17, 1941. G. FLEISCHEL Re. 21,828
PROGRESSIVE CLUTCH CONTROL FOR AUTOMATIC GEAR SHIFTING SYSTEMS
Original Filed March 4, 1931 6 Sheets-Sheet 5
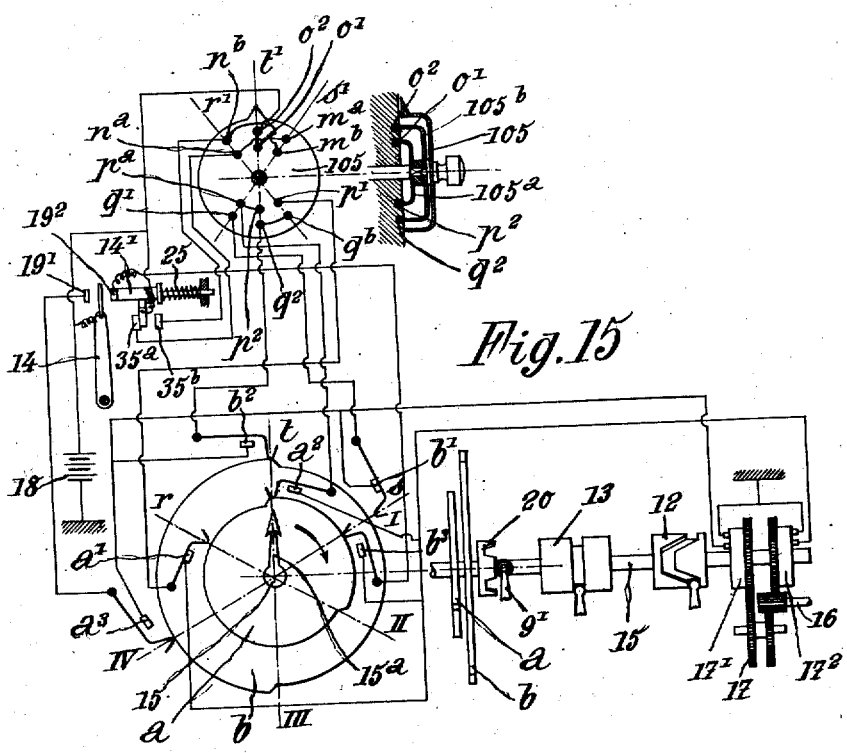
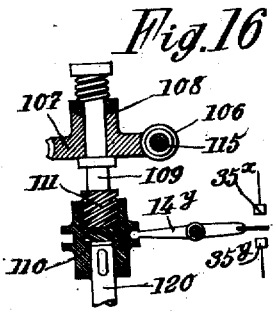
Gaston Fleischel
Inventor
by Louis Barnett
Attorney June 17, 1941. G. FLEISCHEL Re. 21,828

PROGRESSIVE CLUTCH CONTROL FOR AUTOMATIC GEAR SHIFTING SYSTEMS

Original Filed March 4. 1931 6 Sheets-Sheet 6

Gaston Fleischel
Inventor
by Louis Barnett
Attorney.

Reissued June 17, 1941

Re. 21,828

UNITED STATES PATENT OFFICE 21,828

PROGRESSIVE CLUTCH CONTROL FOR AUTOMATIC GEAR SHIFTING SYSTEMS

Gaston Fleischel, Bleneau, France

Original No. 1,893,644, dated January 10, 1933, Serial No. 520,090, March 4, 1931. Application for reissue March 1, 1934, Serial No. 713,620

42 Claims. (Cl. 192—.01)

The present invention relates to automatic clutches for automatic gear shifting systems.

Various types of systems have been devised for automatically shifting the gears of automobiles and similar vehicles as a function of changes in speed or variations in load. In none of these systems however, has means been provided for gradually letting in or throwing out the various clutches employed. In the normal operation of a motor car, the operator, before coupling the driving and driven shafts, gradually releases the foot pressure on the clutch pedal so that the coupling action is smooth. If the clutch pedal were suddenly released, the driving and driven shafts could be immediately coupled and the vehicle would advance in jerks. No equivalent graduated clutch control has yet been devised, to the best of the inventor's knowledge, for automatic gear shifting systems. And yet, without such a graduated clutch control, these automatic gear shifting systems remain gravely defective.

One of the objects of the present invention is to provide means for gradually letting in the clutch in automatic gear shifting systems.

Another object is to provide means for varying the mean rate at which the clutch is let in.

An additional object is to provide means for varying both the mean rate at which the clutch is let in and thrown out.

A further object is to provide means for varying the mean rate at which an automatically operated clutch is thrown in or thrown out.

Still another object is to provide means operative to control the clutch so that the beginning and the end of the "letting in" operation is varied, while the beginning of the "throwing out" operation remains substantially constant.

Another object still is to provide means operative by the vehicle driver to throw out the clutch at any moment desired.

Still further objects will appear in the course of the detailed description now to be given with reference to the accompanying drawings, in which:

Figs. 6 to 8 represent three stages in the operation of an electrical type of clutch control;

Figure 1:
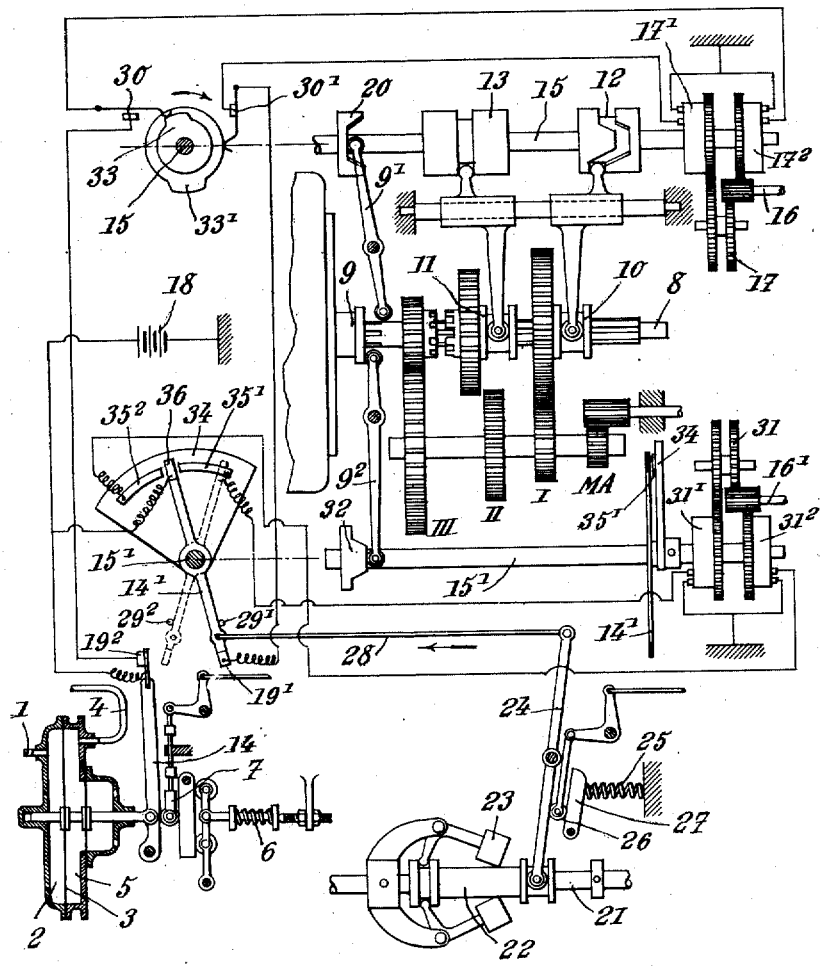
Fig. 1 shows, diagrammatically, a first illustrative embodiment of the invention.
Figure 13:
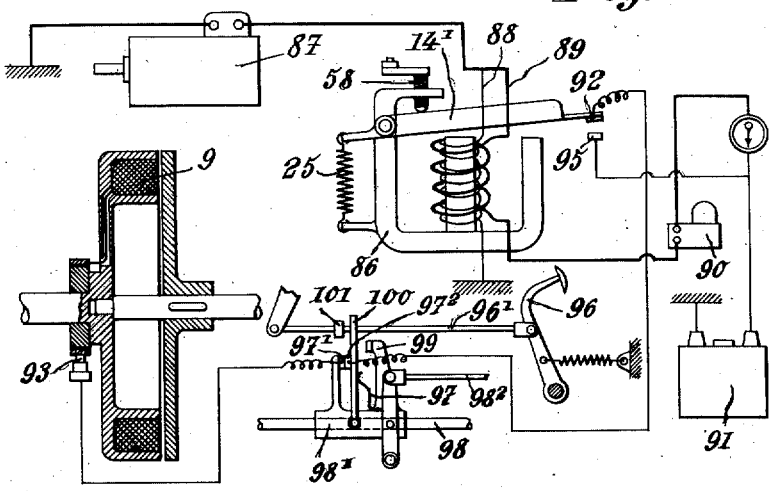
Figure 14:
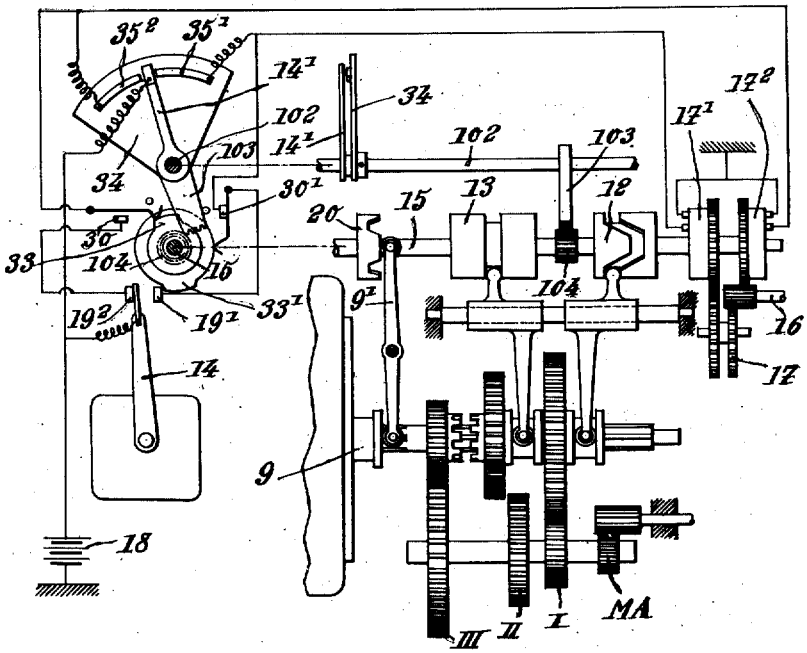
Figure 17:
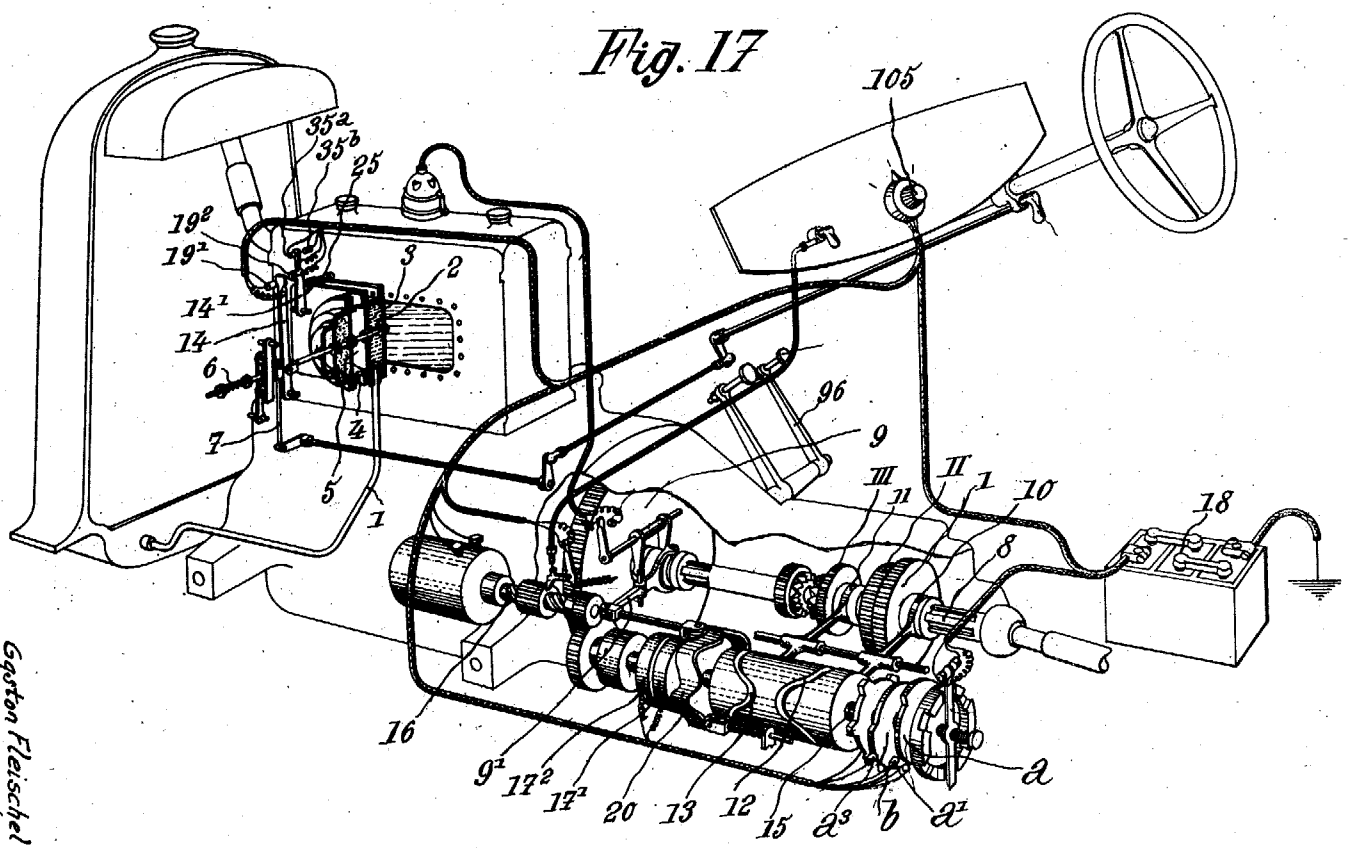

Figs. 9 to 12 inclusive show, diagrammatically, four different inertia operated systems for insuring progressive release of the clutch;

Fig. 13 is a diagrammatic scheme of an electrically operated system for effecting progressive action of the clutch;

Fig. 14 illustrates a modification of the type of assembly shown in Fig. 1;

Fig. 15 shows a form of progressive clutch control applied to both the reverse and forward portions of an automatic gear shift;

Fig. 16 represents, diagrammatically, an auxiliary speed reducing assembly;

Fig. 17 shows a device of the type illustrated in Fig. 15 applied with all the necessary auxiliaries to an automobile for gradually letting in and throwing out the clutch of an automatic gear shifting assembly.

In the form of assembly shown in Fig. 1, an automatic gear shift of the type described in my Patent No. 1,838,096, December 29, 1931, filed March 29, 1930, is shown coupled with means for gradually letting in the main clutch interposed between the motor and driven shafts. The automatic gear shift control is composed of the elements described below. Conduit 1 is connected to the water cooling system of the motor and is adapted to transmit variations in pressure in the latter to a chamber 2, the pressure in the latter thus varying as a function of the motor speed. A diaphragm 3 displaceable under the action of pressures in chamber 2 is arranged therein. Conduit 4 is connected to the carburetor or intake manifold of the motor and is adapted to transmit depressions in the latter to a chamber 5 limited on opposite sides by diaphragm 3 and a diaphragm of smaller dimensions. A rod is rigidly connected to diaphragm 3 and is responsive to variations in pressure inside chambers 2 and 5. A lever 14 is pivotally connected with rod and carries an insulated terminal at one extremity adapted to move into contact with either one of two contacts $19^1$ and $19^2$ or to take up a position between the latter. A spring 6 is mounted to oppose the forces transmitted through conduit 1 and to augment those acting to displace the diaphragms limiting chamber 5, that is to say, to resist displacements of lever 14 caused by a tendency to increase the speed and displacements of said lever caused by increases in the speed-load complex transmitted through conduit 4. An adjustably mounted roller 7 adapted to be displaced manually by the vehicle operator is provided for varying the effect exercised on lever 14 by spring 6 and reacts on a lever system whose nature is apparent from an inspection of Figure 1 and which has been described in detail in my Patent No. 1,838,096, December 29, 1931, filed March 29, 1930.

Shaft 8 is provided with longitudinal slots adapted to support a plurality of gears intended to mesh seriatim with a gear system giving a series of forward gear combinations I, II and III corresponding to first, second and third speeds, and a single gear combination MA for operation in reverse. A pair of collars 10 and 11 are slidably mounted on shaft 8 and keyed thereto by means of slots and adapted to be meshed with appropriate gears (the two right-hand gears on shaft 8) for effecting the various speeds combinations. A pair of cams 12 and 13 are rigidly attached to a cam shaft 15 and have slots or grooves formed therein positioned to react on appropriate elements for successively displacing collars 10 and 11 when cam shaft 15 rotates into different angular positions. Shaft 16 carries a pinion and is driven by a motor (not shown). Means are provided for turning cam shaft 15 in opposite directions comprising a system of gears 17 mounted in driven relation to the shaft 16 and a pair of electromagnetic clutches $17^1$ and $17^2$ adapted selectively to couple cam shaft 15 to gear system 17 so as to rotate said cam shaft in either direction. Electrical conductors extend from electromagnetic clutches $17^1$ and $17^2$ to contact points $19^1$ and $19^2$. A cam 20 keyed to cam shaft 15 and formed to react on a clutch lever $9^1$ is arranged to throw out a main clutch 9 during gear shifting intervals.

The means for gradually and progressively letting in main clutch 9 consist of a shaft 21 continuous with, or driven by, the motor shaft, a sleeve 22 slidably mounted on shaft 21, a pair of centrifugal masses 23 mounted to turn with shaft 21 and connected to lever arms reacting on sleeve 22, a pivotally mounted lever 24 adapted to oscillate under the action of sleeve 22, and a spring 25 reacting on a lever arm 27 and exerting pressure on lever 24. By means of an interposed roller 26, similar to element 7, it is possible to modify the pressure transmitted from spring 25 to lever 24, the position of roller 26 being adjustable by the vehicle operator. A link 28 extends from lever 24 to a lever $14^1$ pivotally mounted to rotate freely on an auxiliary shaft $15^1$ between two extreme positions limited by stops $29^1$ and $29^2$ (lever $14^1$ is shown in the drawings as it would appear when shaft $15^1$ is viewed endwise). Driving shaft $16^1$ is similar to shaft 16. A gear transmission system 31 similar to system 17 is adapted to rotate shaft $15^1$ in opposite directions through electromagnetic clutches $31^1$ and $31^2$ similar to clutches $17^1$ and $17^2$. A cam 32 is keyed to shaft $15^1$ and has surfaces formed thereon adapted to guide a roller mounted on the end of a clutch control lever $9^2$ so that one end of said lever gradually and progressively lets in (and throws out) main clutch 9, the bosses on said cam functioning to react on lever $9^2$ so as to throw out the clutch (position shown in Fig. 1). A pair of arcuate sectors $35^1$ and $35^2$ are mounted in spaced relation on a plate 34 keyed to shaft $15^1$, said sectors moving to contact with the insulated conducting extremity 36 of lever $14^1$. A conductor fed with current from a battery 18 is connected to contact 36, another conductor from the battery to the terminal on the end of lever 14, and other conductors extend from sectors $35^1$ and $35^2$ to clutches $31^1$ and $31^2$ and transmit current to the latter so as to rotate shaft $15^1$ in opposite directions according as element 36 contacts with sector $35^1$ or $35^2$.

From an inspection of the drawings, it will be seen that the action of levers $9^1$ and $9^2$ cannot interfere with one another since, during movement of the vehicle, lever $9^1$ is in the position corresponding to engagement of clutch 9 (position shown in Fig. 1). Lever $9^2$ is therefore free to move between the position corresponding to its position for throwing out the clutch (Fig. 1) and its position for letting in the clutch without influencing the position of lever $9^1$. During these periods, lever 14 is in contact with terminal $19^2$ (speed reduction) controlling clutch $17^2$. In order to prevent shaft 15 from turning in the direction controlled by said last named clutch, a switch 30 is intercalated in the circuit connecting elements $17^2$ and $19^2$ and is maintained in open position during these periods by a cam 33 keyed to shaft 15. A second switch $30^1$ may be provided coacting with a cam $33^1$ also connected to shaft 15 and functioning to break the circuit leading to clutch $17^1$ as soon as the latter shaft shows any tendency to move past the position corresponding to the highest combination III.

The hereinabove described assembly functions in the following manner. Assuming that the vehicle operator depresses the accelerator pedal, the motor shaft gradually increases in speed and causes shaft 21, coupled thereto, to accelerate. Centrifugal masses 23 then move outward and, when the increase in speed becomes sufficient to overcome the resistance of spring 25 (the effect of the latter being regulated by the vehicle operator by displacing roller 26), lever 24 begins to oscillate and transmits its movement through rod 28 to lever $14^1$, normally in contact with stop $29^1$, so as to move contact 36 onto sector $35^1$ and close the circuit through electromagnetic clutch $31^1$. Shaft $15^1$ then begins to turn and simultaneously rotates cam 32 and plate 34. When the latter has rotated sufficiently it brings the space between sectors $35^1$ and $35^2$ into line with contact 36. In accordance with operating conditions, lever $14^1$ may or may not progressively attain the position corresponding to complete engagement of the clutch, the latter taking place when it moves into contact with stop $29^2$. Since shaft $15^1$ follows this displacement, as also cam 32, clutch 9 gradually moves into clutching position as the roller on the end of lever $9^2$ moves over the sloping surface of said cam. If the clutching action takes place too rapidly, the motor shaft and shaft 21 will slow down, centrifugal masses 23 will move toward one another, and lever $14^1$ will reverse direction so as to contact with sector $35^2$ and energize clutch $31^2$. Shaft $15^1$ will then turn in reverse direction and tend to throw out clutch 9. The motor, therefore, itself controls the movement of clutch 9 through the intermediary of the clutch control assembly. In other words, the tendency toward engagement and throwing out of clutch 9 is controlled automatically by the motor without any intervention whatever on the part of the vehicle operator.

It is to be noted that the clutch control assembly taken by itself is not subjected to any stresses whatever, the energy necessary for its functioning being derived from shaft $16^1$.

Once clutch 9 is completely engaged, driven shaft 8 begins to rotate at the speed corresponding to combination I which is already in gear.

When, now, the speed of the motor increases, lever 14 comes into contact with terminal 19¹ and shaft 15, in turning, breaks combination I and causes collar 11 to move into the position corresponding to combination II. At the same time, switch 30 closes under the action of cam 33. Finally lever 14 moves back into neutral position between contacts 19¹ and 19² and comes to rest. Inasmuch as switch 30 is in closed position, the return to combination I becomes possible and takes place as soon as lever 14 swings into contact with terminal 19², clutch 17² then rotating shaft 15 in reverse direction so that cam 33 opens switch 30.

When operating under light loads, the vehicle operator may increase or decrease the speeds at which clutch 9 is actuated by simply displacing roller 26, thus varying the leverage through which the force of counterspring 25 resists the governor force.

During the periods in which the gear changing assembly is shifting from combination I to II or from II to III, cam 20 mounted on shaft 15 acts on lever 9¹ to automatically throw out main clutch 9. In starting or stopping, combination I remains in gear and lever 9¹ occupies the position corresponding to release of the main clutch.

It will be noted that terminal 19¹ controlling the movement of shaft 15 in the direction of increasing speeds is mounted on one end of lever 14¹. This terminal cannot, therefore, come into contact with lever 14 unless lever 14¹ is in the dotted line position shown in Fig. 1 corresponding to full engagement of main clutch 9.

Figure 2:
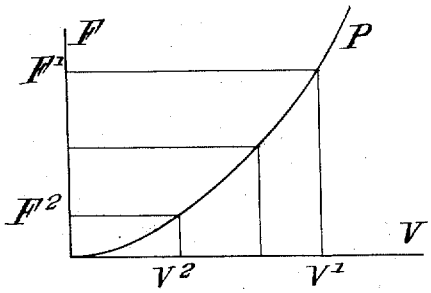
Fig. 2 is a diagram showing how the structure represented in Fig. 1 may be operated to vary the time at which the clutch is let in and thrown out.

Fig. 2 illustrates how the magnitude of the force exerted by spring 25 may be determined. The magnitude of the centrifugal force exerted on masses 23 is represented by the parabola P of the diagram in which motor speeds V are plotted as abscissae and the forces F as ordinates. If it be desired to limit the speeds at which the main clutch is let in or thrown out between two fixed speeds $V^1$ and $V^2$, it is necessary for the vehicle operator to vary the effective force exerted by spring 25 between limits $F^1$ and $F^2$ obtained by following the trajectory of parabola P until it intersects the verticals passing through $V^1$ and $V^2$. Inasmuch as the displacement of roller 26 permits any intermediate effect to be obtained, the vehicle operator is free to choose the speed limits between which main clutch 9 is thrown in or thrown out.

Figure 3:
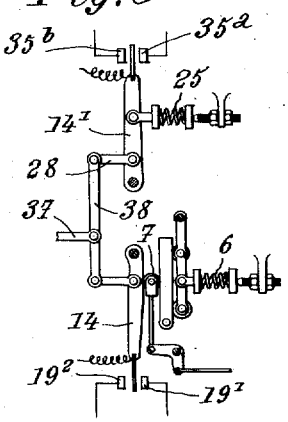
Fig. 3 illustrates one modification of the clutch control system shown in Fig. 1.

In the form of assembly shown in Fig. 1, the mean rate of clutch engagement control system is separate and distinct from the gear shifting system. However, as will be seen from Fig. 3 the same sources of energy may be used to control simultaneously both of these systems by coupling a differential transmission such as rod 37 reacting on lever 38 to displace elements 14 and 14¹ at the same time, rod 37 being displaced by assembly 1, 2, 3, 4, 5, as in Fig. 1. In order to simplify the drawings, sectors 35¹ and 35² are represented in Figs. 3 and 4 by terminals 35ᵃ and 35ᵇ, but in actual construction, the same form of assembly, as is represented in Fig. 1 is employed.

In the special case where the clutch control system is designed to react not only to changes in speed but also to variations in load, adjusting mechanism 26 in Fig. 1 may be considered to be superfluous inasmuch as the load factor automatically varies the rate at which the clutch is let in. The vehicle operator, need not, therefore, concern himself with adjustment of the clutch control system. However, adjusting element 7, controlling the automatic gear shifting system may be retained to increase the flexibility of operation.

Figure 4:
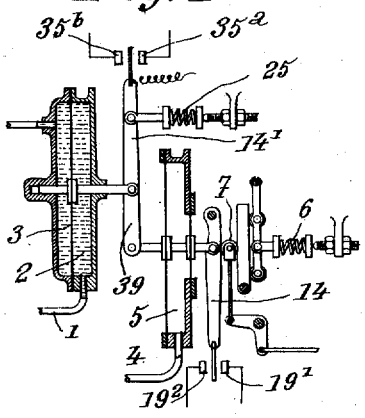
Fig. 4 represents a second modification of the same clutch control assembly.

In the form of device represented in Fig. 4, a single source controls both the clutch and automatic gear shifting systems. Here, variations of speed are transmitted simultaneously to both control levers 14 and 14¹, while variations in load are transmitted to control lever 14 alone. To this end, variations in speed are transmitted directly to a lever 39, whereas the speed-load complex resulting from variations in the depression in the intake manifold react at a point situated between levers 39 and 14.

Figure 5:
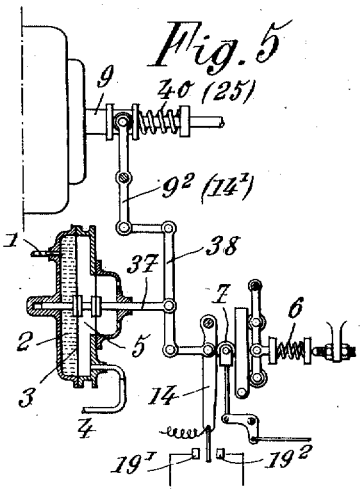
Fig. 5 shows a third modification of the clutch control illustrated in Fig. 1.

If desired, the automatic clutch control system may be actuated, during starting, without recourse being had to any auxiliary source of energy. Such an assembly is illustrated in Fig. 5. The structures employed are essentially the same as those shown in Fig. 3 with the difference that the magnitude of the forces entering into play is increased so that a spring 40, reacting on main clutch 9, replaces spring 25 (Figs. 1 to 4) in function. Lever 14¹ may therefore be eliminated, or rather combined with lever 9² (Fig. 1) controlling the main clutch. This form of device cannot, however, be applied except in the case where the effort exerted by lever 14¹ is limited and of constant value. This is the case when a constant resistance such as that of spring 40 is the only one which must be overcome.

Under special circumstances, it may be desired to dissociate clearly the speeds at which the operations of letting, and throwing out, of the main clutch are effected. The speed at which the clutch is let in should be chosen so as to lie at the lower limit of the zone in which speed combination I functions in order to prevent stalling of the motor. On the other hand, under special difficult conditions of operation, the vehicle operator may find it advantageous to adjust the speed at which the clutch is let in so that the latter lies well within the zone of operation in combination I, thus permitting the motor to turn at a higher speed and develop more effective power facilitating starting on a steep incline or the like.

Figure 6:
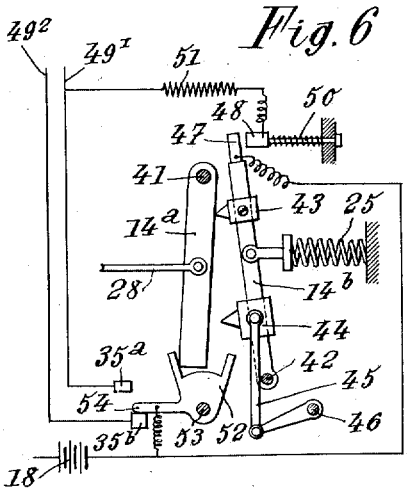

In order to be able to modify the speed limit at which the clutch is thrown in without changing that at which it is thrown out, some such assembly as is shown in Figs. 6 to 8 should be used. Here lever 14¹ controlling the clutch (Fig. 1), is replaced by two levers 14ᵃ and 14ᵇ, the former being controlled by rod 28 (Fig. 1) responding to variations in speed or load or both, but without the intervention of spring 25, while the latter lever responds to the action of the last named spring. Levers 14ᵃ and 14ᵇ are mounted to swing in a common plane about points 41 and 42 respectively, the free end of one lever being positioned substantially at the same level as the pivot of the other. Lever 14ᵇ carries a pair of pivoting points 43 and 44 capable of contacting with lever 14ᵃ; the former is fixed (adjustably) while the latter is mounted to slide under the action of any convenient form of transmission such as 45. Element 44 may be displaced manually by the vehicle operator or automatically under the action of a displacing force varying as a function of the load on the motor and reacting on shaft 46 controlling connecting rod 45. The free extremity of lever 14ᵃ engages in a recess formed on a rotatable sector 52 which is mounted to turn on a fixed shaft 53. This recess is formed so that element 52 is displaced with a retarded action relatively to the movements of lever $14^a$. Inasmuch as the forces acting on lever $14^a$ tend, for increasing speeds of the motor, to displace lever $14^a$ against the action of spring 25, it will be seen, from an inspection of Fig. 6, that the length of the lever arm interposed between rod 28 and spring 25 will act to favor the forces displacing the lever whereas, when the device moves into the position shown in Fig. 8, they act to favor the spring. Fig. 7 shows an intermediate position in which the leverage is about to change. This position should be so chosen that the magnitude of the forces acting on the lever corresponds to a speed lying between the limiting values $V^1$, and $V^2$ and during which either group of opposing forces has any decisive advantage over the other.

The above described assembly may be used to replace single lever $14^1$ shown in Fig. 1. In such a case, plate 34 and conducting sectors $35^1$ and $35^2$ function as current distributors, these latter sectors taking the place of terminal $35^a$ and $35^b$ connected through circuits $49^1$ and $49^2$ to electromagnetic clutches $31^1$ and $31^2$ (Fig. 1). The current is directed toward one or the other of these clutches by an insulated arm 54 connected to source of current 18 and rigidly connected to sector 42. It will be seen that this latter arm functions to replace lever $14^1$ in Fig. 1 in the following way.

When the motor speeds exceed the value $V^2$, arm 54 occupies a position for which main clutch 9 is completely thrown out under the action of the current flowing through terminal $35^b$ (or sector $35^2$, see Fig. 6). As soon as the motor speed surpasses $V^2$, levers $14^a$ and $14^b$ move into the position shown in Fig. 7; but sector 52 does not yet rotate and it is only when speed $V^1$ is attained that it does (Fig. 8), arm 54 then contacting with terminal $35^a$ (or sector $35^1$) and causing element 9 to move into clutching position.

When the motor speed becomes less than value $V^1$ levers $14^a$ and $14^b$ return to the position shown in Fig. 7; but, because of the slightly retarded movement of sector 52, arm 54 remains in the position for which clutch 9 is in engagement. It is only when the motor speeds drop below $V^2$ that the levers move back into the position shown in Fig. 6 at the same time displacing sector 52 so that arm 54 contacts with terminal $35^b$ and throws main clutch 9 out.

It will thus be seen that the speed for which clutch 9 is thrown out, $V^2$, is completely separated from that in which the clutch is let in $V^1$, the former value ($V^2$) being constant while the latter changes in accordance with the position of element 44. In all cases the value of $V^1$ remains greater than that of $V^2$.

If clutch 9 is of the electromagnetic type, circuit 49 may be connected directly to the exciting coils of the clutch, sector $35^1$ may be replaced by a single terminal $35^a$, and circuit $49^2$ and sector $35^2$ (or terminal $35^b$) may be eliminated, whereby the mode of operation becomes identical with that just described. When such an arrangement is employed the movement of lever $14^b$ may be utilized to make the action of electromagnetic clutch 9 progressive. To this end, source of current 18 is connected to an arm 47 mounted on the free extremity of lever $14^b$ and positioned to come into contact with a terminal 48 when the apparatus is in the positions represented in Figs. 7 and 8. This latter terminal being mounted on a flexible support 50 and being connected to circuit $49^1$ through an ohmic resistance 51.

Below motor speed $V^2$, the current cannot pass to clutch 9. Above this speed, levers $14^a$ and $14^b$ occupy the position shown in Fig. 7 and close contact 47—48 so as to supply current to clutch 9 in quantities insufficient to let the latter in completely. At speed $V^1$ (Fig. 8), contact $35^a$—54 is closed and current flows directly to clutch 9 so as to let the latter in completely.

When the various operating elements return to the position shown in Fig. 7, contacts 47—48 and $35^a$—54 supply current in parallel relation to the clutch and the latter remains in complete clutching position until the speed falls to value $V^2$ (Fig. 6). Both contacts are then simultaneously broken.

If desired, the gradual clutching action may be subdivided into a much larger number of phases by modifying the assembly so that arm 47 successively contacts with a series of flexible terminals such as 48, the circuits connected to each of these resilient terminals including resistances of decreasing value.

Instead of utilizing the control lever itself for bringing in or cutting out resistance or resistances 51 for obtaining progressive action, a mechanism entirely independent of the control lever may be utilized, said mechanism responding to variations in the acceleration of the vehicle. As soon as the variations of acceleration surpass a predetermined upper limit, this mechanism may come into action to limit temporarily the extent to which the main clutch is let in. It is to be noted that, aside from the special case where the vehicle operator makes a manoeuvre which causes the vehicle to advance in jerks (too rapid application of the brakes, for example), these jerks are caused principally by letting in the main clutch too rapidly.

In order to prevent this latter effect from being produced, it is sufficient to introduce a proper resistance (or a plurality of graded resistances coming into action successively) into the circuit supplying current to the clutch, if electromagnetic, or to the electric servo-motor of a friction clutch.

Fig. 9 shows such a device applied to an assembly of the type shown in Figs. 1 to 5, the showing being simplified by connecting contact terminals $35^a$ and $35^b$ to electromagnetic clutches $31^1$ and $31^2$.

The assembly for preventing jerks consists of a cylinder 61 freely suspended from a pair of links 62 pivoted at fixed points 63, the upper extremities of the links being connected to a mass 60 balancing that of the cylinder so that the entire assembly is sensitive to changes in acceleration or slope. The ends of cylinder 60 are provided with calibrated orifices 66 and a pair of springs 70 tend to move the cylinder towards its mean or central position. A pair of pistons $64^1$ and $64^2$ connected together by a rod 67 are slidably mounted inside cylinder 60 and are displaced by the movement of a pendular mass 68 suspended from point 69, said mass responding to changes in velocity. Current source 18 is not connected directly to lever $14^1$, but to an auxiliary lever $14^x$ mounted on mass 60. When cylinder 61 and mass 60 occupy their mean or central position, lever $14^x$ contacts with a terminal 56 so as to permit current to flow to lever $14^1$, the latter then acting to control the clutch in the same manner as shown in Fig. 1. When mass 68 is displaced in the direction of the arrow as a result of a too rapid release of clutch 9, it acts on rod 67 and piston $64^1$ so as to compress the air in cylinder 61. The latter then moves so that lever $14^x$ contacts with a terminal $35^n$ connected to terminal $35^b$ thus causing clutch 9 to be thrown out irrespective of the position of lever $14^1$. If the acceleration is such as to act on mass 68 in the opposite direction, lever $14^x$ contacts with a terminal $35^m$ connected to contact $35^a$ causing clutch 9 to move into clutching position. If the accelerations in either direction are slow and gradual i. e., do not produce jerks, piston $64^1$ and $64^2$ slide inside cylinder 61 without displacing the latter, the air under compression escaping through calibrated orifices 66. Lever $14^x$, therefore, does not move out of contact with terminal 56.

Fig. 10 shows a similar assembly for modifying the action of clutch 9 when the latter is of the electromagnetic type. Here, jerks are eliminated by reducing the current energizing the clutch as soon as the rate of change of speed (acceleration) surpasses a predetermined value. Terminal $35^b$, corresponding to throwing out of the clutch is arranged to be dead, whereas terminal $35^a$ is connected directly to the exciting coils of clutch 9. Lever $14^x$, in circuit with battery 18, is in contact with terminal 56 connected by proper leads to lever $14^1$. An ohmic resistance 51 is inserted between lever $14^x$ and terminal 56. As soon as lever $14^x$ moves out of contact with terminal 56 under the action of a sudden change in speed in either direction, current passes through resistance 51 so as to reduce the current acting to move element 9 into clutching position.

In the form shown in Fig. 11 variations in the acceleration of a shaft 72 connected to the motor shaft or to the vehicle are utilized to vary the extent to which clutch 9 is engaged. Shaft 72 is provided with a threaded portion 73 of rapid pitch and the latter is in threaded engagement with a fly wheel 71. A pair of friction plates 76 engage with opposite faces of the fly wheel and are held in intimate contact with the latter by a pair of springs 75. The frictional forces rotate the fly wheel as soon as the latter ceases to be acted on by a force sufficient to overcome the former; that is to say, if the vehicle or motor accelerates normally, the latter reacts on shaft 72 to modify its speed of rotation. During this time, fly wheel 71, by inertia, tends to maintain its own acceleration. If the difference between these two accelerations is small, the frictional forces are sufficient to force fly wheel 71 to follow the variations in speed of shaft 72. On the contrary, if the difference in speed surpasses a predetermined limit, the frictional forces become insufficient and the angular velocity of the fly wheel becomes greater or less than that of shaft 72 according to the direction of acceleration. Inasmuch as the flywheel is mounted on a threaded element integral with shaft 72, it will then move in one direction or the other so as to displace a lever $14^x$ guided in slide 74 engaging with the fly wheel by means of a forked element terminating on opposite sides of the fly wheel in rollers 79. Lever $14^x$ may move into contact with either one of two terminals $35^m$ and $35^n$ similar to those described in Fig. 9 when clutch 9 is of the friction type (Fig. 1) or with a single terminal 56 similar to the one shown in Fig. 10 if clutch 9 be of the electromagnetic variety.

In the form shown in Fig. 12, a fixed shaft 80 is keyed to a fixed, toothed sector 81 and carries an arm 85 from which a cylindrical mass 82 is suspended. The axis of element 82 supports a pinion 77 meshing with sector 81 and a pendular mass 68 is suspended from said axis. If mass 82 were freely suspended from shaft 80, masses 68 and 82 would be inclined equally under the effect of any given change in acceleration in either direction; that is to say, points 80 and 83 would lie in a common plane more or less inclined to the vertical. The polar inertia of mass 82, which is obliged to rotate about its own axis at the same time that it turns about shaft 80 of the center, exerts a braking action on the movement toward equilibrium position. On the contrary, mass 68, being perfectly free, moves instantaneously into the latter position. It will, therefore, be seen that, with each change of acceleration, the arms from which masses 68 and 82 are suspended will move out of phase. Each of said last named arms is provided with springs $85^1$ tending to maintain them in alignment when the variations in speed are slow. If the variations become rapid, the springs yield and the arms move out of alignment. When this happens, contacts similar to those above described in connection with Figs. 9 and 10 come into action to modify the movement of clutch 9. To this end, supporting arm 85 for mass 82 may be provided with contacts 56, $35^m$ and $35^n$ and also with springs $85^1$. The arm supporting mass 68 may, similarly, be provided with an extension $14^x$ connected to battery 18 and positioned to contact with terminal 56 when elements 85 and $14^x$ are in alignment. From an inspection of the drawings, it would be seen that when lever $14^x$ moves out of alignment with rod 85, its contact with terminal 56 is broken and the circuit through terminal $35^m$ or $35^n$ is closed to modify the action of clutch 9 in one direction or the other. As will be obvious to those skilled in the art, this structure may be modified by the addition of resistance 51 in the manner shown in Fig. 10 when clutch 9 is of the electromagnetic type or if an electric servo-motor is used to control a clutch of the friction variety.

In the case where a progressively actuated clutch of the electromagnetic type is to be used, it may be desired to use a purely electrical control for the clutch actuating lever.

Various types of purely electric controls are already in use for actuating electromagnetic clutches. Generally, a dynamo driven by the motor is employed and use is made of the fact that, at very low speeds, the dynamo supplies no current whatever, while with increasing speeds the difference of potential at its terminals increases until it becomes equal to that across the terminals of the battery. A make and break switch then, generally, enters into operation to establish communication between the dynamo and the battery so that the former may charge the latter at a substantially constant voltage. It is sufficient merely to connect the circuit exciting the electromagnetic clutch to the dynamo terminals to obtain automatic functioning of the latter for any variation in motor operation transmitted to the dynamo. Thus, reduction in motor speed reduces the voltage and tends to de-energize the clutch, whereas, increase in speed has the contrary effect. Solutions of this kind suffer from the disadvantage that the motor speed for which the clutch is completely released is constant and close to that for which the dynamo and battery are coupled in charging and charged relation. When the motor slows down, the speed at which the clutch is thrown out is very close to that for which it is let in.

In the form of assembly shown in Fig. 13, this disadvantage is eliminated and the speed at which the clutch is completely let in may be modified at the will of the operator (or automatically), the speed at which the clutch is thrown out remaining constant. Here, lever 14¹, controlling clutch 9, forms the armature of electromagnet 86 and moves against the action of spring 25. Variations in speed of the motor react on armature 14¹ as a function of changes in current supplied by dynamo 87. The latter is connected in conductive relation to a pair of independent windings 88 and 89, the former (88) being of fine wire having a large number of turns and being connected at opposite extremities to the dynamo and to the ground (the other terminal of the dynamo being also grounded), while the latter (89) is formed of relatively thick wire connected at opposite extremities to the same terminal of the dynamo as winding 88 and to make and break switch 90. Winding 89, it will therefore be seen, is traversed by a current of varying strength supplied by the dynamo until it is connected to battery 91. The current flowing in winding 88 will then become constant as will also the magnetic flux created thereby. Although winding 89 is permanently connected to the dynamo, it is not traversed by the current until the battery begins to be charged. When this happens, the current flowing therethrough progressively increases until the maximum value which may be supplied by the dynamo is reached. The action of the magnetic flux on armature 14¹ increases, therefore, constantly until the motor speed is reached for which the current supply coming from the dynamo is at its maximum. The speed for which armature 14¹ is attracted depends on two factors, namely, the resistance of spring 25 and the size of the air gap. The latter may be modified by means of a threaded stop 58 which may be displaced either by the vehicle operator or automatically through the intervention of an appropriate mechanism responsive to variations in the load on the motor (a dynamometer of any convenient type). The tension of spring 25 should be adjusted so that when the air gap is minimum, armature 14 is attracted at the lowest speed at which it is desired that the clutch be released. The maximum value of the air gap is then adjusted so that the motor speed for which attraction takes place be the highest for which the clutch is released. It will thus be seen, that by manipulating stop 58, any desired limits may be fixed between the extreme values indicated. Armature 14¹ supports an insulated arm 92 connected to brush 93 supplying current to electromagnetic clutch 9. When armature 14¹ is in its lowest (attracted) position, arm 92 touches a terminal 95 connected in circuit with battery 91. Inasmuch as the closure of contact 92—95 of the circuit exciting clutch 9 takes place at a motor speed regulated by the position of screw 58, this latter speed may be regulated to lie within the limits above indicated. Moreover, the speed at which the clutch is thrown out is less than that at which it is let in, since the former corresponds to a smaller air gap than the smallest which can be obtained by adjusting screw 58. As a consequence, the exciting circuit remains closed until the value of the current attains a very small value, that is, one for which the motor speed is correspondingly small.

The assembly shown in Fig. 13 is designed to interrupt the circuit actuating clutch 9 as soon as the vehicle operator ceases to depress the accelerator pedal. To this end, a sleeve 98¹ is slidably mounted on a rod 98 and may be displaced by any convenient form of transmission 98² connected to the usual device for manually modifying the opening of the butterfly valve in the carburetor at idling or low speeds. A contact 97¹ is rigidly mounted on sleeve 98¹ and is connected to electromagnetic clutch 9, while a movable contact 97² mounted on an arm 100 pivoted on sleeve 98 is conductively connected to battery 91 through contact 92. A spring 97 tends to force terminal 97² toward fixed contact 97¹. Sleeve 98¹ is also provided with a stop 99 limiting the movement of rod 100 when the latter is displaced by a stop 101 rigidly attached to a rod 96¹ extending from the carburetor valve control lever to accelerating pedal 96, this displacement taking place when the accelerator pedal moves toward its released position. In practice, it is found that this assembly functions to assure breaking of the circuit exciting clutch 9 when the motor is idling irrespective of the position into which sleeve 98¹ has been moved by the vehicle operator, i. e., whatever be the opening of the carburetor valve in idling or slow speed position. It will also be seen that, as soon as the pedal is depressed, the contact is reestablished.

In the various examples given above, the elements controlling the clutch and the gear shifting assemblies are more or less distinct. As regards the various elements responding to the aforementioned control assemblies to execute the clutch and gear shifting operations, these have been described as being entirely different as are also the sources of energy actuating the same. It is possible, however, to simplify these various assemblies by combining the mechanism designed to operate the clutch and gear shifting assemblies and also the sources of energy supplying the latter.

Fig. 14 shows how this may be done. Here, recourse is had to a transmission, a gear shift control and a clutch control of the type illustrated in Fig. 1, corresponding elements being designated by the same reference characters. For the sake of simplification, the clutch and gear shift control mechanisms have been represented solely by their respective levers 14 and 14¹. Shaft 15, carries cams 12 and 13 controlling permutations of speed ratio, while cam 20 acts to throw out clutch 9 during the interval that gears are being shifted. This cam is profiled so as to carry out the combined functions of cams 20 and 32 shown in Fig. 1; that is to say, both clutch and gear shifting operations. Shaft 15 and the various elements mounted thereon are here modified so that an extra position is provided corresponding to that for which the vehicle is at rest and clutch 9 is thrown out. In the special case where shaft 15 controls the transmission provided with three advance speed combinations, a first position must be provided for operation in neutral, a second position in which main clutch 9 is thrown out while combination I remains in gear (transmission of the snatch gear type), a third position wherein clutch 9 is let in completely and the driving and driven shafts are coupled in combination I, and two other positions corresponding to operation in each of combinations II and III. The rest of assembly remains substantially the same as that indicated in Fig. 1, shaft 16 driving inverting transmission 17, electromagnetic clutches 17¹, 17² and being controlled by lever 14 contacting with terminals 19¹ and 19² while the same lever or lever 14¹ coacts with assembly 34, 35¹, 35², to energize electromagnetic clutches 17¹ and 17² when clutch 9 is to be let in or thrown out. A single source of current 18 supplies the circuits controlled by both levers 14 and 14¹.

As indicated earlier in the description, it is necessary to distinguish clearly between operation at starting when shaft 15 should be able to oscillate between the position corresponding to the complete throwing out of the clutch (neutral) and the position for which the clutch is completely let in (operation in combination I) under the control of lever 14¹. The latter transmits the effects of release of the clutch to the motor and should be able to correct these effects at all periods prior to the movement of element 9 into complete clutching position. For changes of speed ratio, on the contrary, shaft 15 should move without vascillation from the position corresponding to one speed combination to the next under the control of lever 14 and without any possibility of changing its direction of rotation once it begins. Moreover, each manoeuvre should be completed in a minimum of time. It will be recalled that the adjustment of the forces acting on levers 14 and 14¹ are such that, during starting, only lever 14¹ can move, lever 14 remaining at rest in contact with terminal 19² controlling clutch 17² (speed ratio reduction). Contrariwise, during a gear shifting operation, lever 14 can move into contact with either terminal 19¹ (increasing speed combinations) or with terminal 19² (decreasing speed combinations) while lever 14¹ remains at rest in the position corresponding to complete engagement of clutch 9.

In order to obtain the simplification desired (1) shaft 15 may be provided with switches having the same function as those designated by the reference characters 30 and 30¹ in Fig. 1 as also with the cams controlling the latter 33 and 33¹, or (2) sector 34, supporting conductors 35¹ and 35², may be mounted to rotate with shaft 15 during the starting period by means of an assembly composed of an auxiliary shaft 102, a toothed sector 103 keyed to shaft 102, and a pinion 104 keyed to shaft 15 and having teeth formed on only portions thereof so that it is in mesh only for those positions of shaft 15 corresponding to the periods during which clutch 9 is let in. When the latter is in complete clutching position, sector 103 is no longer in mesh with pinion 104 and shaft 15 is solely under the control of gear shifting lever 14. Obviously, the periodic coupling of sector 34 to shaft 15 may be effected in any equivalent manner.

The structure shown in Fig. 15 is designed so that the vehicle operator need only adjust the position of a dial 105 so as to occupy any one of three positions corresponding to operation in neutral, reverse, or advance and then depress the accelerator so that the necessary gear shifting and clutch displacing operations occur automatically. In order to simplify the drawings, elements 15, 12, 13 and 20 are assumed to be identical with those shown in Fig. 14 as also lever 14 and the gear shifting mechanisms controlled thereby. Lever 14¹, however, does not oscillate, as in Fig. 14, by translation between terminals 35ᵃ and 35ᵇ so as to throw out and let in clutch 9, this translation is effected solely but, instead, under the control lever 14′ and its opposing spring 25; that is to say, the forces controlling gear shifting functions also control clutch 9. Inasmuch as the speeds at which the clutch is let in and thrown out lie below the zone of operation in combination I, the throwing out of the clutch occurs, when the vehicle slows down under the pressure of lever 14 as soon as the speed corresponding to combination I, is too great for the motor to support. The complete engagement of the clutch becomes again possible as soon as the motor speed is sufficiently great.

As in the case of the assembly represented in Fig. 14, terminals 19¹ corresponds to increases in speed ratio and 19² to decreases. If combination III is driving the vehicle and conditions of operation require a change into combination II, this change is effected by contact of lever 14 with terminal 19². As soon as this has occurred lever 14 comes back into neutral position without having time to compress spring 25. Element 14¹, therefore, remains in contact with terminal 35ᵃ, corresponding to engagement of the clutch. On the contrary, if the vehicle is moving in combination I and the motor slows down, lever 14, being subjected principally to the action of opposing spring 6 (Fig. 1) whose action increases as the speed diminishes, is able to overcome the tension exerted by spring 25, thus displacing element 14¹ from terminal 35ᵃ and 35ᵇ controlling the throwing out of clutch 9. During this period, lever 14 remains in contact with terminal 19² and combination I remains in mesh. Cam 12 may be so formed so that once the clutch is thrown out and shaft 15 turns into neutral position, combination I is thrown out of mesh. If the motor speed increases, lever 14 moves from terminal 19² to terminal 19¹, spring 25 moves element 14¹ into contact with terminal 35ᵃ so that fluctuations in the motor speed assure throwing out and letting in of the clutch automatically as may be necessary.

The above described arrangement is an example of a clutch and gear shifting control actuated from a common source and in which lever 14¹ is under the command of lever 14.

If it be desired, in an automatic control, to make use of a single shaft 15 for actuating clutch 9 and the transmission for both directions of movement, it is necessary for said shaft to be able to take up as many distinct positions as there are combinations of movement, the latter term being understood as covering the sum of all possible advance and reverse speeds plus one position for operation in neutral. If, thus, in the example shown in Fig. 15, it be desired to provide for four advancing combinations I, II, III and IV and for one reverse combination MA, shaft 15 should be able to occupy any one of six distinct positions. Cam 20, controlling main clutch 9, should act on lever 9 so that, at the position corresponding to neutral for shaft 15, clutch 9 is thrown out and so that, when this shaft moves into position for combination I or for reverse (rotation of 60° in either direction), clutch 9 progressively moves into clutching position while at the same time this constituting the principal object of the invention, shaft 15 oscillates back and forth between any two neighboring distinct positions of operation, i. e., reverses, in case of necessity, to temporarily throw out the clutch if complete engagement of the latter would be premature. Cam 20 should also be formed in the manner described in connection with preceding forms of the invention, i. e., so that the clutch is automatically thrown out without any special precautions being taken during a change from any given combination to the next following.

The entire operating problem, in brief, consists in causing shaft 15 to move through the necessary angle and in proper direction under the action of shaft 16 and clutches $17^1$ and $17^2$. The excitation of one or the other of these latter clutches is under the exclusive control of lever $14^1$ and terminals $35^a$ and $35^b$ during the starting period and under that of lever 14 and terminals $19^1$ and $19^2$ during the periods of gear shifting. This is made possible because of the fact that lever $14^1$ reacts in either direction to changes in motor operation to correct the movements of principal clutch 9 while lever 14 acts only to control unidirectional movements of the gear shifting assembly.

In the left hand portion of Fig. 15, a diagram is shown of an electrical control permitting the operator to obtain forward, neutral or reverse operations by turning dial 105. In this diagram, shaft 15 is represented as it would appear if it were viewed endwise and is provided with an indicating hand $15^a$ showing just how the assembly is operating at any given moment.

Shaft 15 carries a pair of cams, *a*, *b* capable of acting on two groups of switches each composed of three elements $a^1$, $a^2$, $b^3$ and $b^1$, $b^2$, $a^3$. Each of these cams is profiled so as to insure the opening and closing of the switches as will be indicated hereinafter. The positions of shaft 15 corresponding to operation in reverse, neutral, or advance in combination I are indicated by the letters *r*, *t*, *s*. The position for operation in combination I has been shown as coinciding with *s* although this combination remains in mesh until position *t*; corresponding to operation in neutral is reached at which time, since clutch 9 is completely thrown out, it can permutate into the reverse combinations whose position (with the clutch completely let in) is designated by *r*, this combination of operations being easily obtainable by giving cam 12 an appropriate form. The other positions of operation are indicated by II, III and IV.

Dial 105, formed of insulating material, turns about its axis in front of two groups of contacts distributed along two circumferences whose centers coincide with that of the dial itself. The latter carries two diametrically positioned contacts $105^a$ and $105^b$ capable of closing the circuit between the contacts lying in one or the other of the above groups.

The positions corresponding to operation in reverse, neutral, and advance, for dial 105 have been indicated by the characters $r^1$, $t^1$ and $s^1$ respectively. A pair of terminals $o^1$ and $p^2$, connected to battery 18 and switch $a^2$ respectively, and a second pair of terminals $o^2$ and $q^2$, connected to battery 18 and to switch $b^2$, are positioned to come into alignment with $t^1$ (neutral). Similarly, a first pair of terminals $m^b$ and $p^a$ connected to terminal $35^b$ (throwing out of the clutch) of lever $14^1$ and to switch $a^2$ respectively, and a second pair of terminals $m^a$ and $q^1$ connected to terminal $35^a$ (letting in of the clutch) of lever $14^1$ and to switch $b^1$ respectively, are positioned to align with $s^1$ (advance). In the same way, a pair of terminals $n^a$ and $p^1$, connected to terminal $35^a$ and to switch $a^1$ respectively, and a second pair of terminals $n^b$ and $q^b$, connected respectively to terminal $35^b$ and to switch $b^2$, are mounted to align with $r^1$ (reverse). Switches $a^3$ and $b^3$ are connected, respectively, to the circuits extending between clutches $17^1$ and $17^2$ and terminals $19^1$ and $19^2$ of lever 14. They are positioned relatively to the cam bosses so that switch $b^3$ (decreasing speeds) remains open during the starting period in either direction, while lever 14 remains in contact with terminal $19^2$, switch $a^3$ remaining open so as to prevent contact of lever 14 with terminal $19^1$ (increasing speeds) until clutch 9 is let in completely. In other words, switches $a^3$ and $b^3$ perform the same function as switches 30 and $30^1$ shown in Fig. 1.

The hereinabove described assembly functions in the following way. When dial 105 and shaft 15 are both in neutral position, switches $a^2$ and $b^2$ as well as $a^3$ and $b^3$ are open, while switches $a^1$ and $b^1$, controlling clutches $17^1$ and $17^2$ respectively remain closed. However, these latter clutches cannot be excited since terminals $b^1$ and $a^1$ are not connected to battery 18. At the same time, lever 14 is forced into contact with terminal $35^b$ by lever 14, spring 25 being compressed.

As soon as the vehicle operator turns dial 105 into position $s^1$ (advance) and depresses the accelerator, lever 14 moves out of contact with terminal $19^2$ toward terminal $19^1$, spring 25 relaxes and lever $14^1$ moves into contact with terminal $35^a$ (position indicated in Fig. 15). The circuit through clutch $17^1$ then closes and current flows from battery 18 through lever $14^1$, terminal $35^a$, terminal $n^a$, terminal $m^a$, contact $105^b$, terminal $q^1$, switch $b^1$, and clutch $17^1$ whence it returns to the battery via the ground. Shaft 15 then turns in the direction of the arrow, rotating cam 20 so as to engage clutch 9. At the same time, cams *a* and *b* rotate while switch $b^2$ remains open under the thrust transmitted from the boss of cam *b*. Switch $a^2$ contrariwise, controlling clutch $17^2$ closes as soon as shaft 15 leaves neutral position. The circuit through clutch $17^2$, however, remains open at point $35^b$.

If the conditions of operation permit complete engagement of clutch 9, shaft 15 continues its movement until the boss of cam *b* moves into position to open switch $b^1$, thus breaking the circuit through clutch $17^1$ and stopping shaft 15. Lever $14^1$ remains in contact with terminal $35^a$, switches $a^3$ and $b^3$ are closed and lever 14 may enter into operation to excite clutches $17^1$ and $17^2$ through terminals $19^1$ and $19^2$ to effect gear shifting in either direction.

If, for any reason, the clutch is too rapidly engaged during starting, lever 14, because of the slowing down of the motor, acts on lever $14^1$ so that the latter moves out of contact with terminal $35^a$ and into contact with terminal $35^b$ thus breaking the circuit through clutch $17^1$. Current then passes from battery 18 through lever $14^1$, terminal $35^b$, terminal $n^b$, contact $105^a$, terminal $p^a$, and switch $a^2$ to clutch $17^2$, thus turning shaft 15 in the reverse direction and throwing out clutch 9. If the rate of declutching becomes excessive, the motor accelerates, lever 14 moves toward terminal $19^1$ and permits lever $14^1$ to move back into contact with terminal $35^a$ thus causing shaft 15 to reverse direction again to engage the clutch.

Dial 105 being in position $s^1$ (advance), if the vehicle operator moves it back to position $t^1$ (neutral), the following operations take place. Switches $b^1$ and $b^2$ are open and switches $a^1$ and $a^2$ closed. The displacement of dial 105 toward $t^1$ closes the circuit through clutch $17^2$ (throwing out of the clutch) since the current passes from battery 18 via terminals $q^2$, $o^1$, $p^2$, $p^a$, and switch $a^2$ to clutch $17^2$ so as to bring shaft 15 back to neutral. It is to be noted that, at the beginning of the operation, it makes no difference whether lever $14^1$ be in contact with terminal $35^a$ or $35^b$, since battery 18 is directly connected to terminal $o^2$. If the operator moves dial 105 into line with $r^1$ (reverse) a similar series of operations are effected except that (1) switch $b^2$, instead of being connected to terminal $35^a$, is conductively connected through $q^2$, $q^b$, and $n^b$ with terminal $35^b$ and (2) switch $a^2$ is connected through terminals $p^1$ and $n^a$ to terminal $35^a$. The apparatus functions, therefore, as in the case for forward movement, except that terminal $35^b$ causes shaft 15 to turn in the direction of the arrow, corresponding in this case, to throwing out of the clutch, while terminal $35^a$ causes shaft 15 to turn in the opposite direction, corresponding to engagement of the clutch, cam 20 being properly profiled to obtain these effects.

The manoeuvring of the clutch, is therefore, assured in both directions and the motor itself, in accordance with the power it is developing (which depends on the opening of the carburetor valve), regulates the degree of release of the clutch until the latter is complete. The vehicle operator is, consequently, complete master of the starting operation which takes place slowly and gently if he depresses the accelerator pedal only slightly and which may take place rapidly if he exerts considerable effort on the latter. In either case racing or excessive slowing down of the motor is not to be feared. The passage from the starting period to the automatic shifting of the gears with increasing speed occurs without transition and without any intervention whatever on the part of the vehicle operator.

The above described assembly is sufficient for the automatic operation of clutch 9, when the car is on the open road. In the city and in the special case where delicate movements are to be made in traffic or along a side walk or inside a garage, it is necessary to provide means for displacing the vehicle at speeds below that of combination I when clutch 9 is completely engaged. It is also desirable that this means be completely thrown out as soon as the vehicle attains a speed compatible with the difficulties of the situation.

This result is obtained by coupling a speed limiting device automatically controlled and operative to throw out clutch 9 partially or entirely as soon as the speed reaches a predetermined value which may be as small as desired. This device enters into operation only when desired by the vehicle operator, who carries out a special manoeuvre, a second manoeuvre being necessary to throw the device out of action. It is to be noted that the device in question is entirely independent of, and distinct from, regulating mechanism 26 shown in Fig. 1.

If the transmission includes an electromagnetic clutch the effect desired may be easily obtained by merely providing a rotatable shaft driven by, or in synchronism with, the wheels of the vehicle and by coupling thereto a centrifugal type of regulator which will break the clutch circuit as soon as any predetermined limiting velocity is obtained. The regulator may be arranged to be thrown into, or out of, action by a control within reach of the vehicle operator.

If the transmission is of the ordinary friction type, an auxiliary control with a clutch analogous to the one shown in Fig. 1 and including a lever $14^1$ coacting with a pair of terminals $35^1$ and $35^2$ may be used. The forces acting on this lever may include a centrifugal regulator coupled to a shaft in driven relation to the vehicle wheels, the regulator being designed to throw out the clutch at a speed considerably less than the clutch control mechanism shown in Fig. 1 which, of course, will be temporarily thrown out of action. The centrifugal regulator may come into action against the resistance of a spring or similar adjustable device.

Fig. 16 shows another possible arrangement for obtaining especially low speeds. The speed of the shaft driving the rear wheels may be limited by only partially letting in clutch 9 so that said shaft rotates at only a fraction of the motor speed. If the motor for example, functions at 500–1,000 and 1,500 R. P. M., the various operating elements may be designed so that the vehicle moves at only 0.5, 1.0 and 1.5 kilometers per hour respectively. This permits the vehicle operator to obtain very slow displacements without making any special manoeuvre. To this end, the demultiplying device shown in Fig. 16 is provided and consists of the following elements; an endless screw 106 driven from, or by, the motor shaft and meshing with a helicoidal wheel 107 having 30 teeth formed thereon; a conical friction element 108 adapted to connect shaft 109 to wheel 107 so as to cause shaft 109 to rotate at one thirtieth the speed of shaft 115; a sleeve 110 engaging threadedly with a screw 111 of long pitch integral with shaft 109 and slidably engaging with a long keyway formed in a shaft 120 in driven relation with the wheels; and a lever $14^y$ engaging in a groove formed on sleeve 110 and capable of contacting with either one of two terminals $35^x$ and $35^y$ controlling the letting in and the throwing out of clutch 9 respectively.

From the foregoing, it will at once be seen that, if the speed of shaft 120 tends to become greater than that of shaft 109, sleeve 110 will move axially so as to bring lever $14^y$ into contact with terminal $35^y$ to throw out the clutch. On the other hand, if the speed of shaft 120 becomes less than that of 109, terminal $35^x$ comes into action to engage the clutch. These operations occur in parallel to those indicated above for the ordinary clutch manipulating operations. The former hardly influences the latter since the energy that comes into play is extremely small.

From the foregoing it will be seen that, when the vehicle operator, by a special manoeuvre, couples shaft 109 to the motor shaft through the intermediary of the demultiplying device, the vehicle will move with the clutch mechanism in a constant state of slippage and at a speed which is but a very small fraction of that of the motor. Inasmuch as the latter indirectly controls the movements of lever $14^y$, it is impossible for the motor to race.

Fig. 17 represents a complete assembly including the dial control shown in Fig. 15 and capable of functioning to shift the gears automatically into the various advancing speed combinations when the accelerator lever is depressed or to obtain operation in neutral or reverse by mere rotation of dial 105. Certain of the structures shown in this figure have been shown and described in my patent, No. 1,838,096, December 29, 1931, filed March 29, 1930.

What I claim is:

1. In a vehicle, a motor including a driving shaft, a driven shaft, a clutch for coupling said shafts in driving and driven relation, and a clutch control assembly including a rotatable shaft, a fly-wheel mounted in flexibly driven relation to said shaft, and means operative by differences in speed between said last named shaft and said fly-wheel to displace said clutch.

2. In a vehicle assembly, a motor including a driving shaft, a driven shaft, a clutch operative to couple said shafts in driving and driven relation, means operative by changes in the working conditions of the motor to progressively let in said clutch in combination with means operative to throw the clutch out when the rate of change of speed of the vehicle exceeds a predetermined value.

3. In a vehicle assembly, a motor including a driving shaft, a driven shaft, a clutch operative to couple said shafts in driving and driven relation, means operative by changes in the working conditions of the motor to progressively let in said clutch in combination with means for preventing said clutch from being completely let in.

4. A structure as defined in claim 2, in combination with means for maintaining said clutch in a constant state of slip when let in by the clutch control.

5. In a vehicle, a motor provided with a driving shaft, a driven shaft, means operative to multiply and demultiply the relative speed of said shafts, a clutch interposed between said shafts, an accelerator, a movable control operative to actuate said means so as to obtain operation in neutral, reverse, and any one of several advancing speeds, means operative by movement of said accelerator and of said movable control to actuate said first named means, and means operative by the rate of change of speed of the vehicle to vary the position of said clutch.

6. In a vehicle assembly, a motor including a driving shaft, a driven shaft, a clutch interposed between said driving and driven shafts, a gear assembly adapted to couple said driving and driven shafts in various speed ratios, a cam shaft controlling said gear assembly and said clutch, means operative by variations in the operating conditions of the motor to actuate said cam shaft, a second cam shaft controlling said clutch, and means operative by variations in speed of one of said shafts to actuate said second cam shaft.

7. In a vehicle assembly, a motor including a driving shaft, a driven shaft, a clutch operable to connect said shafts in driving and driven relation, means operative to progressively let in and throw out said clutch, a movable element operative to actuate said means, said movable element being independent of and positioned to move into and out of contact with said means, and means operative by changes in load on the motor and variations in speed of one of said shafts to displace said movable element into and out of contact with said first named means.

8. In a vehicle assembly, a motor provided with an induction pipe and including a driving shaft, a driven shaft, a clutch operable to connect said shafts in driving and driven relation, means operative to progressively let in and throw out said clutch, a movable element operative to actuate said means, said movable element being independent of and positioned to move into and out of contact with said means, and means operative at least in part by changes in suction exerted by the motor to displace said movable element into and out of contact with said first named means.

9. In a vehicle assembly, a motor including an electric source of supply, a driving shaft, a driven shaft, a clutch operable to connect said shafts in driving and driven relation, means operative to progressively let in and throw out said clutch, a movable element operative to actuate said means, electrical means controlling said movable element, a lever controlling said electrical means, and means operative by changes in the operative conditions of the motor to actuate said lever.

10. In a vehicle assembly, a motor including an electric source of supply, a driving shaft, a driven shaft, a clutch operable to connect said shafts in driving and driven relation, means operative to progressively let in and throw out said clutch, means including a terminal operative to actuate said means, a movable element operative to contact with said terminal and means operative by changes in the operating conditions of the motor to displace said movable element into and out of contact with said terminal.

11. In a vehicle assembly, a motor including a driving shaft, a driven shaft, a clutch operable to connect said shafts in driving and driven relation, a rotatable cam shaft to actuate said clutch, reversible means including a motor and operative to rotate said shaft in one direction to let in said clutch and in opposite direction to throw out said clutch, means including a lever operative by the working conditions of the first named means to actuate said reversible motor in a predetermined direction, said lever being operative to reverse the direction of rotation of said reversible means.

12. In a vehicle assembly, a motor including a driving shaft, a driven shaft, a clutch operable to connect said shafts in driving and driven relation, a rotatable cam shaft to actuate said clutch, a rotatable shaft and a pair of clutches operative to rotate said cam shaft respectively in one direction to let in said clutch and in opposite direction to throw out said clutch, means including a lever operative by the working conditions of said first named motor to actuate one of said clutches.

13. In a vehicle assembly, a motor including, a driving shaft, a driven shaft, a clutch operable to connect said shafts in driving and driven relation, means operative to progressively let in and throw out said clutch, a movable element operative to actuate said means, said movable element being independent of and positioned to move into and out of contact with said means and means operative by changes in the working conditions of the motor together with resilient means to displace said movable element into and out of contact with said first named means.

14. In a vehicle assembly, a motor including a driving shaft, a driven shaft, a clutch operable to connect said shafts in driving and driven relation, means operative to progressively let in and throw out said clutch, a movable element operative to actuate said means, said movable element being independent of and positioned to move into and out of contact with said means, means operative by changes in the working conditions of the motor, together with resilient means to displace said movable element into and out of contact with said first named means and means to control the tension of said resilient means.

15. In a vehicle assembly, a motor including a driving shaft, a driven shaft, a clutch operable to connect said shafts in driving and driven relation, means operative to progressively let in and throw out said clutch, a lever operative to actuate said means, means operative by changes in the working conditions of the motor to actuate said lever, a spring reacting on said lever, a roller contacting with said lever, a second lever positioned in contact with said roller and submitted to the action of the spring and means to displace said roller.

16. In a vehicle assembly, a motor including a driving shaft, a driven shaft, a clutch operable to connect said shafts in driving and driven relation, means operative to progressively let in and throw out said clutch, a lever operative to actuate said means, means operative by changes in the working conditions of the motor to actuate said lever, a spring reacting on said lever, a roller contacting with said lever, a second lever positioned in contact with said roller and submitted to the action of the spring and means actuated by the operator to displace said roller.

17. In a vehicle assembly, a water-cooled motor provided with an induction pipe and including a driving shaft, a driven shaft, a clutch operable to connect said shafts in driving and driven relation, means operative to progressively let in and throw out said clutch, a pump driven from said driving shaft, means operative by changes in pressure exerted by liquid discharged from said pump and means operative by changes of the pressure within said induction to act on said first named means.

18. In a vehicle assembly, a motor provided with an induction pipe and including a driving shaft, a driven shaft, a clutch operable to connect said shafts in driving and driven relation, means operative to progressively let in and throw out said clutch, and a mechanism moved by changes in speed of one of said shafts and by changes in the pressure within said conduit to act on said first named means.

19. In a vehicle assembly, a motor including an induction conduit, a driving shaft, a driven shaft, a clutch operable to connect said shafts in driving and driven relation, means operative to progressively let in and throw out said clutch, a mechanism moved by changes in speed of one of said shafts and by changes in the pressure within said conduit to act on said first named means together with resilient means, exerting an opposing thrust on said mechanism.

20. In a vehicle assembly, a motor including a driving shaft, a driven shaft, a clutch operable to connect said shafts in driving and driven relation, means operative to progressively let in and throw out said clutch, electrical means to control said means, a lever operative by changes in the speed of the motor to act on the controlling switch of said electrical means and means operative to obtain the action of said switch to let in the clutch at a different speed of the motor as that for which said clutch is thrown out.

21. A structure as claimed in claim 20 in combination with means operative to vary the speed limits at which the clutch is let in and thrown out.

22. In a vehicle assembly, comprising a motor including a driving shaft, a driven shaft, a clutch operable to connect said shafts in driving and driven relation, means operative to progressively let in and throw out said clutch, a first mechanism moved by changes in speed of one of said shafts to act on said means and a second mechanism moved by changes in speed of one of said shafts by the intermediary of a speed reducing gear, and means operated by the conductor to produce the action of one of said mechanisms on said first named means.

23. A structure as claimed in claim 22 in combination with means acting on said first and said second mechanism and moved by changes in the pressure within the induction conduit of the motor.

24. In a vehicle assembly, a motor including a driving shaft, a driven shaft, a clutch operable to connect said shafts in driving and driven relation, means operative to progressively let in and throw out said clutch, a mechanism moved by changes in the working conditions of said motor to act on said means and a pendular mass, freely suspended on said vehicle and operative to control the action of said mechanism on said clutch by sudden changes in the velocity of said vehicle.

25. In a vehicle, a motor, a driving shaft, a driven shaft, a clutch for coupling said shafts, means including a servo-motor for controlling said clutch, and means controlled by variations in the speed of the vehicle to influence the operation of said control means during clutching.

26. In a vehicle, a motor, a driving shaft, a driven shaft, a clutch for coupling said shafts, means including a servo-motor for controlling said clutch, and means controlled by the acceleration of the vehicle to vary the mean rate of operation of said control means.

27. In a vehicle assembly, a motor including a driving shaft, a driven shaft, a clutch operative to couple said shafts in driving and driven relation, means operative to progressively let in said clutch in combination with means operative during operation of said first means to throw the clutch out when the rate of change of speed of the vehicle exceeds a predetermined value.

28. In a vehicle assembly, a motor including a driving shaft, a driven shaft, a clutch operable to connect said shafts in driving and driven relation, servo-motor means operative to progressively let in said clutch, and a pendular mass freely suspended on said vehicle and operative to control the action of said servo-motor on said clutch by sudden changes in the velocity of said vehicle.

29. In a vehicle, a motor including a driving shaft, a driven shaft, a clutch for coupling said shafts in driving and driven relation, and a clutch control assembly comprising inertia means responsive to variations in the velocity of the vehicle to control the mean rate of engagement of said clutch.

30. In a vehicle, a motor including a driving shaft, a driven shaft, a clutch for coupling said shafts in driving and driven relation, and means controlled by acceleration of the vehicle to vary the mean rate of engagement of said clutch in proportion to the acceleration.

31. In a vehicle, a motor including a driving shaft, a driven shaft, a clutch for coupling said shafts in driving and driven relation, and inertia means controlled by acceleration of the vehicle to vary the mean rate of engagement of said clutch in proportion to the acceleration.

32. In a vehicle, a motor including a driving shaft, a driven shaft, a clutch for coupling said shafts in driving and driven relation, and a clutch control assembly including a pair of members, yielding means connecting said members, means for normally moving one of said members at a rate proportional to the speed of the vehicle, the second member by its inertia tending to produce relative movement between the members during changes in velocity of the vehicle, and means operated by relative movement of said members to control the mean rate of engagement of said clutch.

33. In a vehicle, a motor including a driving shaft, a driven shaft, a clutch for coupling said shafts in driving and driven relation, and a clutch control assembly including a pair of relatively movable elements at least one of which is movable with respect to the vehicle and has a considerable moment of inertia, means yieldingly connecting said elements, a control member connected to one of said elements and operated by movement thereof, said elements being relatively movable in accordance with the value of the acceleration of the vehicle, and means operated by said control member to control the mean rate of engagement of said clutch.

34. In a vehicle, a motor including a driving shaft, a driven shaft, a clutch for coupling said shafts in driving and driven relation, a mass movably mounted on said vehicle and movable with respect thereto by variations in the velocity of the vehicle, means yieldingly resisting such movement, and means controlled by movement of the mass to control the operation of said clutch.

35. In a vehicle, a motor including a driving shaft, a driven shaft, a clutch for coupling said shafts in driving and driven relation, a mass carried by said vehicle, yielding means for normally moving said mass at a rate proportional to the speed of the vehicle, said mass moving at a different speed during sudden changes in the velocity of the vehicle, and means operated by such movement at a different speed to control the operation of the clutch.

36. In a vehicle, a motor including a driving shaft, a driven shaft, a clutch for coupling said shafts in driving and driven relation, clutch control elements including a pendulum pivotally mounted on said vehicle and a movable member, means yieldingly connecting said pendulum and said movable member, and means controlled by movement of one of said elements to control the operation of said clutch.

37. In a vehicle, a motor including a driving shaft, a driven shaft, a clutch for coupling said shafts in driving and driven relation, a pendulum pivotally mounted on said vehicle, an element movably mounted on said vehicle, means yieldingly connecting said pendulum and said element, means yieldingly resisting movement of said element, and means controlled by movement of said element to control the operation of said clutch.

38. In a vehicle, a motor including a driving shaft, a driven shaft, a clutch for coupling said shafts in driving and driven relation, a pendulum pivotally mounted on said vehicle, an element movably mounted on said vehicle, means yieldingly connecting said pendulum and said element, means yieldingly resisting movement of said element, and means controlled by movement of said element to control the operation of said clutch, said connecting means permitting slow relative movement between said pendulum and said element but causing said pendulum and element to move together at increased speeds.

39. In a vehicle, a motor including a driving shaft, a driven shaft, a clutch for coupling said shafts in driving and driven relation, a pendulum pivotally mounted on said vehicle, an element movably mounted on said vehicle, means yieldingly connecting said pendulum and said element, means yieldingly resisting movement of said element, and means controlled by movement of said element to control the operation of said clutch, said connecting means comprising a cylinder having an opening of reduced dimensions connected to one of said elements and pendulum, and a piston slidable in said cylinder connected to the other.

40. In a vehicle, a motor including a driving shaft, a driven shaft, a clutch for coupling said shafts in driving and driven relation, and a clutch control assembly including a rotatable shaft, a fly wheel threadedly mounted on said shaft, means yieldingly coupling said wheel to said shaft to cause it normally to turn with the shaft, and means operated by relative movement of said wheel along said shaft caused by differences in speed produced by the inertia of the fly wheel during sudden changes in the speed of the shaft to control said clutch.

41. In a vehicle, a motor including a driving shaft, a driven shaft, a clutch for coupling said shafts in driving and driven relation, and a clutch control assembly including a rotatable shaft, a fly wheel threadedly mounted on said shaft, spring operated friction clutches yieldingly coupling said wheel to said shaft to cause it normally to turn with the shaft, and means operated by relative movement of said wheel along said shaft caused by differences in speed produced by the inertia of the fly wheel during sudden changes in the speed of the shaft to control said clutch.

42. The combination, with a motor car and automatic clutch-controlling mechanism therefor, of a pendulum suspended on said car so as to swing longitudinally thereof, and means, controlling in part the operation of clutch-controlling mechanism, operatively connected to said pendulum; whereby on starting said car into motion or suddenly accelerating or decelerating said car motion, the consequent oscillation of said pendulum will modify the action of said clutch-controlling mechanism.

GASTON FLEISCHEL.